United States Patent
Motegi

(10) Patent No.: US 7,009,929 B2
(45) Date of Patent: Mar. 7, 2006

(54) OPTICAL PICKUP, INCLUDING A MIRROR FOR CHANGING LIGHT POLARIZATION DIRECTION, AND INFORMATION REPRODUCING APPARATUS HAVING THE SAME

(75) Inventor: Takehiro Motegi, Tokorozawa (JP)

(73) Assignee: Pioneer Corporation, Tokyo-to (JP)

( * ) Notice: Subject to any disclaimer, the term of this patent is extended or adjusted under 35 U.S.C. 154(b) by 32 days.

(21) Appl. No.: 10/782,868

(22) Filed: Feb. 23, 2004

(65) Prior Publication Data

US 2004/0165519 A1    Aug. 26, 2004

(30) Foreign Application Priority Data

Feb. 24, 2003  (JP)  ............................ P2003-046613

(51) Int. Cl.
*G11B 7/00*  (2006.01)

(52) U.S. Cl. ............................................... 369/112.16

(58) Field of Classification Search ........... 369/112.01, 369/112.03, 112.05, 112.16, 112.21, 112.29, 369/121
See application file for complete search history.

(56) References Cited

U.S. PATENT DOCUMENTS

| | | | |
|---|---|---|---|
| 4,789,978 A | 12/1988 | Shikama et al. | |
| 4,841,510 A * | 6/1989 | Yoshizawa | 369/44.23 |
| 5,577,017 A * | 11/1996 | Yamamoto et al. | 369/13.29 |
| 6,111,840 A | 8/2000 | Hajjar | |
| 6,445,453 B1 | 9/2002 | Hill | |
| 2001/0021162 A1 | 9/2001 | Kikuchi et al. | 369/112.02 |

FOREIGN PATENT DOCUMENTS

EP  0 740 295 A1  10/1996

* cited by examiner

*Primary Examiner*—Paul W. Huber
(74) *Attorney, Agent, or Firm*—Drinker Biddle & Reath LLP

(57) ABSTRACT

The optical pickup reads an information signal by emitting a light beam to an information recording surface of a recording medium having a recording track composed of information pits arranged for recording the information signal. The optical pickup is provided with: a light source which emits the light beam having linear polarization; an optical system which guides the emitted light beam to the information recording surface and further guides light that is emitted from the information recording surface based on the guided light beam, to an optical path different from an optical path to the light source; and a light-receiving device which receives the light guided by the optical system from the information recording surface. The optical system controls a polarization direction of the emitted light beam, with respect to a direction of the recording track.

11 Claims, 5 Drawing Sheets

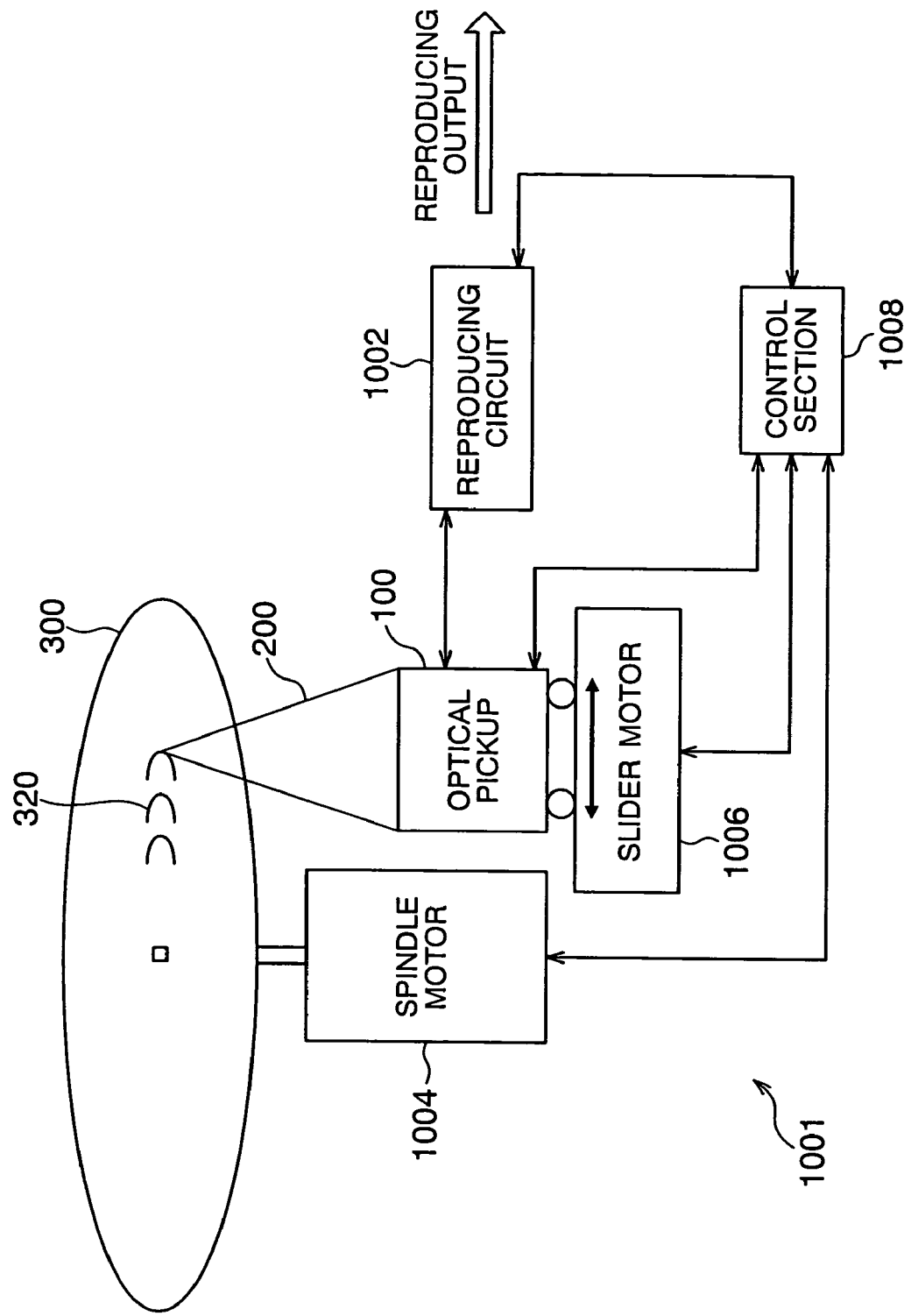

OPTICAL PICKUP, INCLUDING A MIRROR FOR CHANGING LIGHT POLARIZATION DIRECTION, AND INFORMATION REPRODUCING APPARATUS HAVING THE SAME

BACKGROUND OF THE INVENTION

1. Field of the Invention

The present invention relates to a technical field of an optical pickup used for optically reproducing and recording information on a recording medium such as an optical disk in an optical disk player, an optical disk recorder, and so on, and an information reproducing apparatus having the optical pickup.

2. Related Art

Such an optical pickup comprises a light source, a photo detector, an optical path splitting element such as a beam splitter which reflects a light beam emitted from the light source in such a manner as to guide the light beam to a recording medium and transmits reflected light from the recording medium in such a manner as to guide the reflected light to the photo detector, and an object lens which is opposed to an information recording surface of the recording medium. In general, the optical pickup comprises a quarter-wave plate between the object lens and the optical path splitting element to rotate the polarization plane of light which is incident and reflected on the recording medium, that is, to change the polarization state of a light beam. The "polarization state" of the present invention indicates circular polarization, linear polarization, or elliptic polarization. In the case of linear polarization, the polarization state also indicates its direction.

On the other hand, in the case of such an optical pickup, in a light spot formed on the information recording surface by the radiation of a light beam, a region having intensity higher than predetermined intensity (i.e., a so-called far-field region in the light spot) is generally shaped like an ellipse. The attaching angle or the like of optical components is set so that the major axis direction of the ellipse is orthogonal to or in parallel with the direction of a recording track composed of information pits on the information recording surface.

It has been known that during the reproduction of an optical disk, the optical pickup configured thus reduces a signal-to-noise ratio of a reproduction signal due to birefringence on the information recording surface. The birefringence splits light constituting reflected light into two in a transparent layer such as a protective layer of the optical disk. The birefringence is caused by a manufacturing process of the optical disk using a stamper or the like. The birefringence occurs because the distribution of a refractive index in the information recording surface is varied between the inner periphery and the outer periphery of the optical disk. Thus, a variation in jitter amount, that is, a variation in the time base direction of a reproduction signal goes out of a permissible range, so that it becomes difficult to correctly reproduce information.

Hence, various techniques are conventionally proposed. In these techniques, a reproduction signal is generated which is relatively larger than noise (disk noise) on a surface of an optical disk including a transparent layer for generating birefringence and thus the reproduction signal is increased in signal-to-noise ratio. For example, the following optical pickup is proposed: a light beam of linear polarization that is emitted by a semiconductor laser is caused to pass through a quarter-wave plate and thus the light beam is converted into a light beam of circular polarization light, so that the reproducing characteristic of an optical disk is improved without being affected by the direction of birefringence.

Further, the following optical pickup is proposed: a light beam of linear polarization is emitted from an arrangement having a rotated semiconductor laser, the light is incident along a polarization direction at 45° with respect to the direction of a recording track formed of information pits on an information recording surface, and thus the reproducing characteristic of an optical disk is improved.

However, as described above, an optical pickup for generating a light beam of circular polarization needs to additionally comprise the quarter-wave plate to generate a light beam of circular polarization, so that the cost is increased and the apparatus becomes larger or complicated.

Further, according to the research conducted by the inventor, circular polarization can be formed by the phase control of existing optical components without the necessity for adding a quarter-wave plate. However, it is necessary to satisfy the condition of an optical path configuration in an optical pickup, that is, the condition that an incident angle from a half mirror to a rising mirror (reflection mirror) is set at 45° with respect to the parallel line of the rising mirror. Thus, a technical problem arises that it becomes difficult or practically impossible to arrange constituent elements so as to satisfy the above condition in a miniaturized optical pickup.

As described above, when a light beam of linear polarization is emitted from an arrangement having a rotated semiconductor laser and the light is incident along a polarization direction at 45° with respect to the direction of a recording track formed of an information pit on an information recording surface, an angle of 45° with respect to the recording track is formed by the major axis direction of a far-field region in a light spot formed by the light beam. Thus, a technical problem arises that a signal for reproducing an information pit, that is, an RF signal is reduced as compared with the case where the major axis direction of the far-field region is caused to intersect the recording track direction.

SUMMARY OF THE INVENTION

The present invention is devised in view of the above-described problems and has as its object the provision of an optical pickup, which can improve the reproducing characteristic of a recording medium such as an optical disk, that is, the playing ability of a recording medium without increasing the number of optical components or suppressing an increase in the number of optical components, and an information reproducing apparatus having the optical pickup.

The invention will be described below. For a better understanding of the invention, reference should be made to the accompanying drawings in which reference numerals are appended within the parentheses. However, the invention is not limited to the illustrated embodiments.

The above object of the present invention can be achieved by an optical pickup (100) for reading an information signal by emitting a light beam to an information recording surface of a recording medium (300) having a recording track (320) composed of information pits arranged for recording the information signal. The optical pickup (100) is provided with: a light source (110) which emits the light beam having linear polarization; an optical system (140, 150, 160) which guides the emitted light beam to the information recording surface and further guides light that is emitted from the information recording surface based on the guided light beam, to an optical path different from an optical path to the light source; and a light-receiving device (170) which receives the light guided by the optical system (140, 150, 160) from the information recording surface, wherein the optical system (140, 150, 160) controls a polarization direction of the emitted light beam, with respect to a direction of the recording track.

In one aspect of the optical pickup (100) of the present invention, the light source (110) composes of a semiconductor laser; and the optical system (140, 150, 160) controls a polarization direction regarding a major component of the emitted light beam.

The above object of the present invention can be achieved by an information reproducing apparatus (1001) provided with: the above-mentioned optical pickup (100), and a reproducing device (1002) which produces recorded information corresponding to the information signal based on a detection output of the light-receiving device (170) of the optical pickup (100).

The action and other benefits of the present embodiment will be made evident from the following examples

BRIEF DESCRIPTION OF THE DRAWINGS

FIG. 6 is a block diagram showing the embodiment of the information reproducing apparatus according to the present invention.

Figure 1:
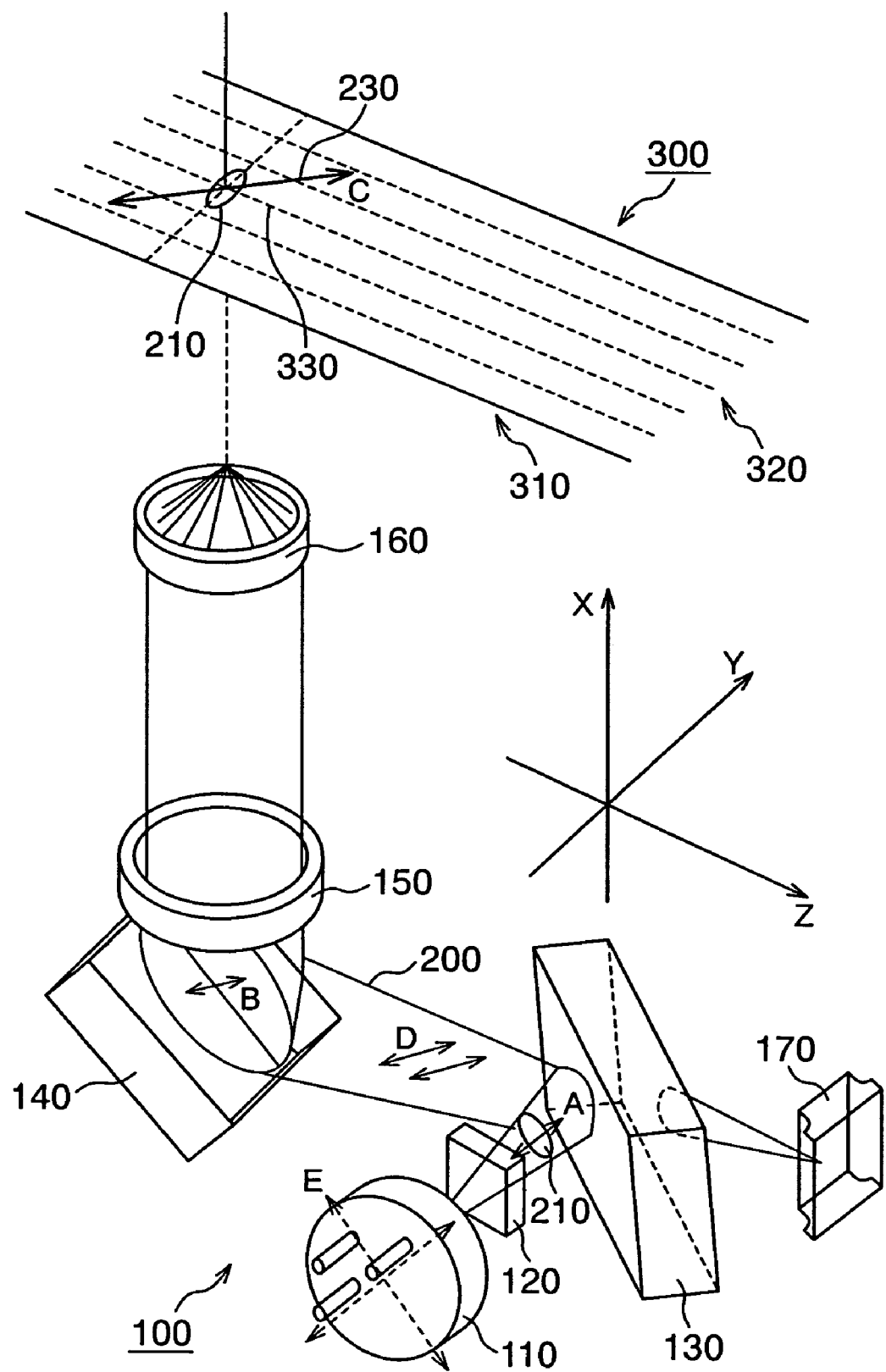
FIG. 1 is an outside perspective view schematically showing an optical path in an optical pickup of Examples 1 and 2 according to an optical pickup of the present invention.

DESCRIPTION OF THE PREFERRED EMBODIMENTS (Embodiment of an Optical Pickup)

An optical pickup of the present embodiment for reading an information signal by emitting a light beam to an information recording surface of a recording medium having a recording track composed of information pits arranged for recording the information signal, is provided with: a light source for emitting the light beam having linear polarization; an optical system for guiding the emitted light beam to the information recording surface and further guiding light, which is emitted from the information recording surface based on the guided light beam, to an optical path different from an optical path to the light source; and light-receiving device for receiving the light guided by the optical system from the information recording surface, wherein the optical system controls a polarization direction of the emitted light beam, with respect to a direction of the recording track.

According to this embodiment, for example, a light beam of linear polarization is emitted from a light source such as a semiconductor laser during an operation. In general, a light beam emitted from a semiconductor laser is flux of light shaped like an ellipse and the light beam has a polarization direction coinciding with a direction parallel to the minor axis of the ellipse. Thus, the light beam is guided to an information recording surface of a recording medium by an optical system and is emitted onto a recording track. Hence, light such as reflected light, diffracted light, and transmitted light that has been modulated corresponding to information pits constituting the recording track is emitted from the information recording surface. Then, the light from the information recording surface is further guided by the optical system to an optical path other than an optical path to the light source. That is, the light is guided to a light-receiving device such as a photo detector. Then, the light from the information recording surface is received by the light-receiving device and a detection signal is generated which indicates an information signal corresponding to an information pit irradiated with the light beam. In this way, the information signal recorded on the recording track is read by the optical pickup.

According to the research conducted by the inventor, it is found that regardless of whether the major axis direction of an elliptic light spot is changed or not with respect to the recording track, or even when the major axis direction of the elliptic light spot is not changed with respect to the recording track, the magnitude of noise and the detection signal that results from birefringence on the information recording surface can be varied individually by changing the polarization direction in a light beam, which forms a light spot, with respect to the recording track. Additionally, it is found that when the polarization direction in a light beam is changed with respect to the direction of the recording track, the changing characteristic of the magnitude of noise and the changing characteristic of the magnitude of the detection signal are different from each other. That is, in some settings of the polarization direction, when noise largely increases, the detection signal does not largely increase or the detection signal considerably decreases at the same time. Alternatively, when noise does not largely increases or noise considerably decreases, the detection signal largely increases at the same time. In short, a magnitude relation between the magnitude of noise and the magnitude of the detection signal is varied by changing a polarization direction with respect to the direction of the recording track, so that a signal-to-noise ratio is increased or reduced. In the present embodiment, particularly an optical system is configured so that the polarization direction of a light beam is changed with respect to the direction of the recording track. Thus, a degree of the change is set beforehand so as to have a higher signal-to-noise ratio as compared with the case where the polarization direction of a light beam is not changed at all. Hence, a detection signal of a high signal-to-noise ratio is read by the optical pickup in the subsequent actual operation. That is, it is possible to efficiently suppress a reduction in the signal-to-noise ratio of the detection signal, for example, on both of the inner periphery and the outer periphery of an optical disk. Thus, it is possible to reduce a probability that an amount of jitter exceeds a permissible range, so that an information signal can be read with precision.

Besides, the angle setting in the polarization direction for increasing a signal-to-noise ratio to a higher, maximum, or highest ratio may be somewhat changed by the actual configuration and specification of the optical system. In all cases, once the optical system is determined, the polarization direction for obtaining a higher, maximum, or largest signal-to-noise ratio can be uniquely determined in general according to an experiment, an experience, mathematics, or a simulation.

Unlike the conventional technique, the polarization direction of a light beam can be sufficiently changed relative to the direction of the recording track by, for example, changing the arrangement of the primary constituent elements of the optical pickup relative to an optical path, without the necessity for additionally providing an optical component such as a quarter-wave plate. The constituent elements include a reflection mirror, a rising mirror, a beam splitter or an optical path splitting element, and various glass lenses.

As a result, according to the optical pickup of the present embodiment, it is possible to improve the reproducing characteristic of a recording medium such as an optical disk, that is, the playing ability of a recording medium without increasing the number of optical components or suppressing an increase in the number of optical components.

In the present invention, the recording medium is composed of, for example, an optical disk and the recording track is arranged concentrically and spirally on the information recording surface. In the case of an optical disk, due to a manufacturing process using a stamper and so on, the distribution of a refractive index on the information recording surface is varied between the inner periphery and the outer periphery of the optical disk. Hence, even when the polarization direction of a light beam is changed by the optical system using the optical pickup of the present invention and thus a birefringent direction is varied between the inner periphery and the outer periphery to a greater or lesser degree, it is possible to effectively prevent a jitter amount from exceeding a permissible range.

In one aspect of the optical pickup according to the present embodiment, the optical system changes the polarization direction so as to bring an angle in the polarization direction close to 45° with respect to the direction of the recording track, as compared with the case where the polarization direction is not changed by the optical system.

According to this aspect, the optical system is configured so that the polarization direction is changed so as to bring the angle in the polarization direction close to 45° with respect to the direction of the recording track, as compared with the case where the polarization direction is not changed. According to the research conducted by the inventor, it has been confirmed that when an angle in the polarization direction is brought close to 45° with respect to the direction of the recording track, a signal-to-noise ratio is fundamentally improved. Therefore, with an optical system configured as the present embodiment, it is possible to improve the reproducing characteristic of an optical disk with relative ease during an operation without the necessity for increasing the number of optical components or while suppressing an increase in the number of optical components.

According to this aspect, the optical system can be configured so that the polarization direction is changed so as to bring the angle in the polarization direction at 30° to 60°.

According to the research conducted by the inventor, it has been found that when an optical setting is made beforehand so as to change an angle in the polarization direction to 30° to 60° with respect to the direction of the recording track, a reading error rate of the recording medium can be fundamentally suppressed to, for example, $10^{-3}$ within a permissible range on practical use during an operation. Therefore, with this configuration, it is possible to maintain an error rate of the optical disk at a proper level on practical use during an operation, without increasing the number of optical components or while suppressing an increase in the number of optical components, thereby improving the reproducing characteristic of the optical disk.

In this case, the optical system can be configured so that the polarization direction is changed so as to bring the angle in the polarization direction at 40° to 50°.

According to the research conducted by the inventor, it has been found that when an optical setting is made beforehand so as to change an angle in the polarization direction to 40° to 50° with respect to the direction of the recording track, a reading error rate of the recording medium can be surely suppressed to, for example, $10^{-3}$ within a permissible range on practical use during an operation. Or, it has been found that the reading error rate can be surely suppressed to more-appropriate low level, which is much smaller than, for example, $10^{-3}$. Therefore, with this configuration, it is possible to surely maintain an error rate of the optical disk at a proper level on practical use with relative ease during an operation, without increasing the number of optical components or while suppressing an increase in the number of optical components, thereby improving the reproducing characteristic of the optical disk.

In this case, the optical system can be further configured so that the polarization direction is changed so as to bring the angle in the polarization direction at 45°.

According to the research of the inventor, it has been found that when an optical setting is made beforehand so as to change an angle in the polarization direction to 45° with respect to the direction of the recording track, a reading error rate of the recording medium can be fundamentally suppressed to a minimum value, a lowest value, or a close value which is much smaller than, for example, $10^{-3}$ during an operation. Therefore, with this configuration, it is possible to maintain an error rate of the optical disk at an extremely low level with relative ease during an operation, without increasing the number of optical components or while suppressing an increase in the number of optical components, thereby remarkably improving the reproducing characteristic of the optical disk.

In another aspect of the optical pickup according to the present embodiment, the optical system comprises a semi-transparent semireflecting mirror for reflecting the emitted light beam, guiding the light beam to the information recording surface after changing the polarization direction upon reflection, transmitting the light from the information recording surface, and guiding the light to the light-receiving device of the optical pickup.

According to this aspect, a semitransparent semireflecting mirror is configured so as to change the polarization direction of a light beam with respect to the direction of the recording track. Thus, by setting a phase difference of the semitransparent semireflecting mirror beforehand, a degree of a change in the polarization direction is set so as to increase a signal-to-noise ratio, so that a detection signal with a high signal-to-noise ratio is read by the optical pickup in the subsequent actual operation. For example, such a semitransparent semireflecting mirror may be provided in a beam splitter which serves as a light splitting element or in a prism. Alternatively, the semitransparent semireflecting mirror may be provided like a plate in a space of the optical pickup. In either case, a phase difference for changing the polarization direction is set on the semitransparent semireflecting mirror, thereby preventing an increase in the number of optical components as a whole.

In further aspect of the optical pickup according to the present embodiment, the optical system comprises a reflection mirror for reflecting the emitted light beam and changing the polarization direction upon reflection.

According to this aspect, the reflection mirror is configured so as to change the polarization direction of the light beam with respect to the direction of the recording track. Thus, by setting a phase difference of the reflection mirror beforehand, a degree of a change in the polarization direction is set so as to increase a signal-to-noise ratio, so that a detection signal with a high signal-to-noise ratio is read by the optical pickup in the subsequent actual operation. For example, such a reflection mirror may be provided as a rising mirror or as another mirror used for determining an optical path. In either case, a phase difference for changing the polarization direction is set on the reflection mirror, thereby preventing an increase in the number of optical components as a whole.

In furthermore aspect of the optical pickup according to the present embodiment, the optical system comprises a grating for diffracting the emitted light beam and changing the polarization direction upon diffraction.

According to this aspect, a diffraction grating (that is, a grating) is configured so as to change the polarization direction of the light beam with respect to the direction of the recording track. Thus, by setting a phase difference of the diffraction grating beforehand, a degree of a change in the polarization direction is set so as to increase a signal-to-noise ratio, so that a detection signal with a high signal-to-noise ratio is read by the optical pickup in the subsequent actual operation. For example, such a diffraction grating is used to generate, from a single light beam, three beams used for the three-beam method. In all cases, a phase difference changing the polarization direction is set on the diffraction grating, thereby preventing an increase in the number of optical components as a whole.

In furthermore aspect of the optical pickup according to the present embodiment, the optical system includes a glass plate with a predetermined thickness, the glass plate transmitting the emitted light beam and changing the polarization direction upon transmission.

According to this aspect, an optical component such as a glass plate with a predetermined thickness is configured so as to change the polarization direction of a light beam with respect to the direction of the recording track. Thus, by setting a phase difference of the optical component such as a glass plate beforehand, a degree of a change in the polarization direction is set so as to increase a signal-to-noise ratio, so that a detection signal with a high signal-to-noise ratio is read by the optical pickup in the subsequent actual operation. Such an optical component such as a glass plate may be used to suppress an increase in temperature, release heat, or prevent dust. Alternatively, an optical component such as a glass plate having asperities may be used that constitutes a collimator lens, a relay lens, a lenticular lens, an object lens, and so on. In all cases, a phase difference changing the polarization direction is set on the optical component such as a glass plate, thereby preventing an increase in the number of optical components as a whole.

In furthermore aspect of the optical pickup according to the present embodiment, the optical system includes a polarizing plate for transmitting the emitted light beam and changing the polarization direction upon transmission.

According to this aspect, a polarizing plate is configured so as to change the polarization direction of a light beam with respect to the direction of the recording track. Thus, by setting the polarizing characteristic and so on of the polarizing plate beforehand, a degree of a change in the polarization direction is set so as to increase a signal-to-noise ratio, so that a detection signal with a high signal-to-noise ratio is read by the optical pickup in the subsequent actual operation. Such a polarizing plate may have a function of changing linear polarization to elliptical polarization, circular polarization, and so on. In all cases, a primary function or additional function other than the function of changing the polarization direction is added to the polarizing plate, thereby preventing an increase in the number of optical components as a whole.

In furthermore aspect of the optical pickup according to the present embodiment, the light source emits the light beam so that flux of light is elliptical in cross section and is shaped like an ellipse having a major axis orthogonally to the polarization direction.

According to this aspect, a light beam is generated by a light source such as a semiconductor laser so that flux of light is elliptical in cross section and is shaped like an ellipse in which a direction orthogonal to the polarization direction serves as a major axis. Thus, by setting a degree of a change in the polarization direction of the light beam beforehand so as to increase a signal-to-noise ratio, a detection signal with a high signal-to-noise ratio is read by the optical pickup in the subsequent actual operation regardless of the major axis direction and the minor axis direction of a far-field region of a light spot formed by the elliptical light beam.

Another optical pickup of the present embodiment for reading an information signal by emitting a light beam to an information recording surface of a recording medium having a recording track composed of information pits arranged for recording the information signal, is provided with: a light source composed of a semiconductor laser for emitting the light beam; an optical system for guiding the emitted light beam to the information recording surface and further guiding light, which is emitted from the information recording surface based on the guided light beam, to an optical path different from an optical path to the light source; and a light-receiving device for receiving the light guided by the optical system from the information recording surface, wherein the optical system controls a polarization direction regarding a major component of the emitted light beam, with respect to a direction of the recording track.

Another optical pickup according to this embodiment configured thus comprises a light source composed of a semiconductor laser. Thus, the polarizing state of a light beam emitted from the light source is almost or completely linear polarization. Further, the optical system changes the polarization direction of a major component of the light beam emitted from the semiconductor laser, that is, an optic element which is almost or completely linear polarization. Here, the "major component" of the light beam indicates an optic element exceeding 50% of the light beam. Therefore, it is possible to obtain the same or a similar operation/ working effect as the optical pickup of the above-described embodiment. Particularly in this case, even when the light beam emitted from the semiconductor laser contains some components other than linear polarization, it is possible to obtain almost the same operation/working effect. For example, also when a light beam of elliptical polarization is emitted from the semiconductor laser, the polarization direction of the major component is changed in the above manner by the optical system of the present invention, so that it is possible to obtain the same or a similar operation/working effect as the optical pickup according to the above-described embodiment.

Additionally, another optical pickup according to the embodiment configured thus can be provided in various forms by replacing the polarization direction of the linear polarization light beam with the polarization direction of the major component, just like the optical pickup according to the above-described embodiment.

(Embodiment of an Information Reproducing Apparatus)

An information reproducing apparatus of the present embodiment comprises one or another optical pickup (including various aspects) according to the above-described embodiment, and a reproducing device for reproducing recorded information which corresponds to the information signal based on a detection output of the light-receiving device.

According to the information reproducing apparatus of the present embodiment, the information reproducing apparatus comprises one or another optical pickup of the above-mentioned embodiment. Therefore, it is possible to put into practical use the information reproducing apparatus, such as an optical disk player, which enables to improve the reproducing characteristic of a recording medium such as an optical disk, that is, the playing ability of a recording medium without increasing the number of optical components or suppressing an increase in the number of optical components.

The action and other benefits of the present embodiment will be made evident from the following examples.

As explained above, according to the embodiment of the optical pickup of the present invention, since the optical pickup comprises the light source, the optical system, and the light-receiving device, it is possible to improve the reproducing characteristic of a recording medium such as an optical disk, that is, the playing ability of a recording medium without increasing the number of optical components or suppressing an increase in the number of optical components. According to the embodiment of the information reproducing apparatus of the present invention, since the information reproducing apparatus comprises the optical pickup according to the above-mentioned embodiment, it is possible to put into practical use the information reproducing apparatus, such as an optical disk player, which enables to improve the reproducing characteristic of a recording medium such as an optical disk, that is, the playing ability of a recording medium without increasing the number of optical components or suppressing an increase in the number of optical components.

The example of the present invention will be described below in accordance with the accompanying drawings.

EXAMPLE 1 of the optical pickup

Figure 2:
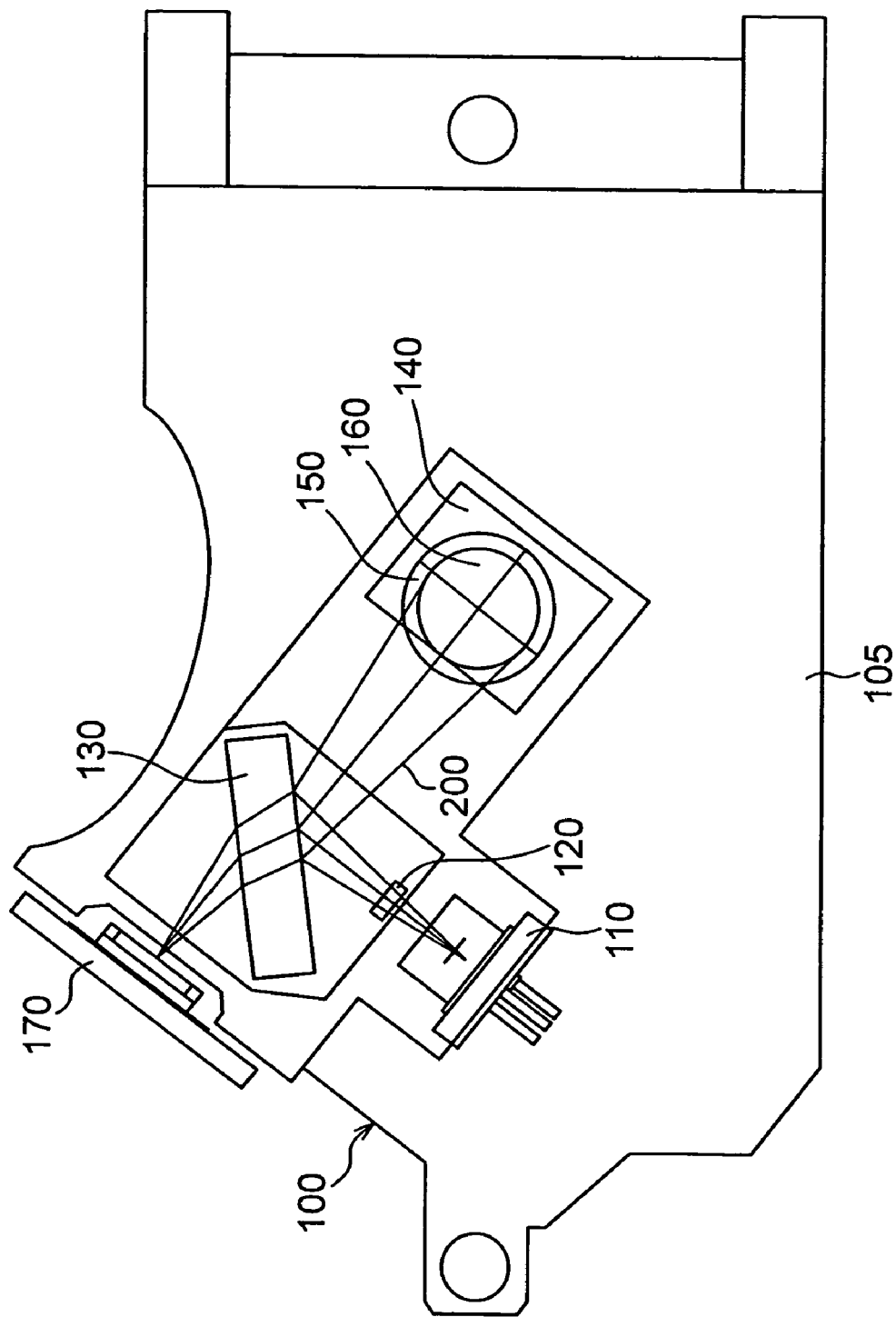
FIG. 2 is a top view showing the internal configuration of the optical pickup in Examples 1 and 2 according to the optical pickup of the present invention.

Referring to FIGS. 1 and 2, the following will discuss Example 1 of an optical pickup according to the present invention. Example 1 of the optical pickup is configured so that the polarization direction of a light beam emitted to a recording medium is controlled by a reflection mirror. FIG. 1 is an external perspective view schematically showing an optical path of an optical pickup 100 according to the present example. FIG. 2 is a top view showing the internal configuration of the optical pickup 100.

As shown in FIGS. 1 and 2, the optical pickup 100 of Example 1 comprises a semiconductor laser 110 constituting an example of a "light source" according to the present invention, a grating 120, a half mirror 130 functioning as an optical path splitting element, a reflection mirror 140 serving as a polarization direction controlling device constituting an example of an "optical system" according to the present invention, a collimator lens 150, an object lens 160, and a photo detector 170 constituting an example of a "light-receiving device" according to the present invention.

As shown in FIG. 2, these optical components are stored in a case 105 of the optical pickup 100. The optical pickup 100 is subjected to carriage driving and so on by a carriage motor (not shown) in such a manner as to move in a direction of intersecting a track 320 on an optical disk 300 shown in FIG. 1. Further, the optical pickup 100 is subjected to focus driving, tracking driving, and so on by an actuator (not shown), so that the focus position and tracking position of a light beam emitted to the track 320 is adjusted.

Referring to FIG. 1, the following will describe the outline of the operations of the optical pickup 100 as a whole, along with the configurations and operations of the optical components.

First, when reproduction is performed on the optical disk 300 by an optical disk player or an optical disk recorder that comprises the optical pickup 100, a semiconductor laser 110 emits a light beam 200 for reproduction.

At this point of time, the emitted light beam 200 travels along the Y direction of FIG. 1 immediately after being emitted from the semiconductor laser 110. The polarization of the light beam is almost linear polarization and the polarization direction forms an angle which generates a P polarization component and an S polarization component when the light beam is incident on the half mirror 130 and the reflection mirror 140. For example, in the X-Z plane, a rotation is made by 35° from the Z direction to the X direction.

At this point of time, a region having intensity higher than a predetermined intensity in the emitted light beam 200 (so-called far-field region 210) is shaped like an ellipse having a major axis shown in FIG. 1. Such an elliptic light beam having a polarization direction paralleling the minor axis direction of the ellipse can be readily emitted by the semiconductor laser 110.

Subsequently, the grating 120 splits the emitted light beam 200 to generate the light beam 200 for reproducing information and a plurality of side beams (not shown) for tracking servo control according to the three-beam method and so on.

For simplifying the explanation, FIG. 1 only shows the optical path of the light beam 200 other than the side beams.

Then, the half mirror 130 reflects the generated light beam 200 and causes the light beam 200 to be incident on the reflection mirror 140. The half mirror 130 may be integrated into, for example, a plane on a part of a prism constituting a beam splitter or may be disposed as a single half mirror in an optical path.

Subsequently, the reflection mirror 140 further reflects the light beam 200 reflected on the half mirror 130 and emits the light beam 200 to the collimator lens 150. At this point of time, on the reflection mirror 140, the polarization direction of the light beam 200 is rotated by, for example, 45° or 135° with respect to the direction of the track 320. The refection mirror 140 is subjected to, for example, surface treatment, and the polarization direction can be controlled by phase difference control on a P polarization component and an S polarization component of a light beam by using an evaporated film. To be specific, a phase difference of the P polarization component and the S polarization component in the light beam is controlled according to a thickness of a multilayer film formed on a surface of a transparent substrate such as a glass plate, the number of films in the multilayer film, a material of each film, the selection of a refractive index, and particularly the setting of an interrelation, so that the polarization direction is changed by a desired angle when the reflection mirror 140 reflects the light beam 200.

Then, the light beam 200 is converted from diffused light to parallel light by the collimator lens 150. Thereafter, the light beam 200 is condensed by the object lens 160 on an information pit 330 which constitutes the track 320 formed on the information recording surface 310 on the optical disk 300. Thus, an elliptic light spot, which corresponds to the light beam 200 emitted by the semiconductor laser 110, is formed on the track 320. Then, the polarization direction in the light spot is changed by the reflection mirror 140 to a direction indicated by a thick arrow 230 in FIG. 1.

Subsequently, the light beam 200 emitted to the optical disk 300 is reflected on the information recording surface 310 and is incident again on the half mirror 130 via the object lens 160, the collimator lens 150, and the reflection mirror 140.

Then, the half mirror 130 transmits the light beam 200 from the optical disk 300 and condenses the light beam 200 on the photo detector 170.

Subsequently, the photo detector 170 generates a light-receiving signal corresponding to the light beam 200, which has been modulated according to a pit array constituting the track 320, from the optical disk 300, and outputs the light-receiving signal to a signal processing section (not shown).

Referring to FIG. 1, the arrangement of the optical components constituting the optical pickup 100 will be described in detail.

When the light beam 200 emitted from the semiconductor laser 110 travels along the Y direction, the semiconductor laser 110 is arranged so that a symmetry axis E of the semiconductor laser 110 is rotated by, for example, 35° from the X direction to the minus Z direction with respect to the Y direction.

The half mirror 130 is arranged so that the P polarization component and the S polarization component are applied to the light beam 200 emitted from the semiconductor laser 110.

The reflection mirror 140 is arranged so that the light beam 200, which has been reflected by the half mirror 130, is reflected to the collimator lens 150 and the light beam 200, which has been reflected by the optical disk 300, is reflected to the half mirror 130.

The grating 120 is disposed between the semiconductor laser 110 and the half mirror 130.

The collimator lens 150 is disposed between the reflection mirror 140 and the object lens 160.

The object lens 160 is disposed at a position of condensing the light beam 200 with respect to the optical disk 300.

The photo detector 170 is disposed at a position of condensing the light beam 200 having passed through the half mirror 130.

Referring to FIG. 1, the following will discuss a change in an angle of the polarization direction 230 of the light beam 200. The polarization direction 230 is almost linear polarization.

In FIG. 1, until the light beam 200 passes through the grating 120 from the semiconductor laser 110 and reaches the half mirror 130, the polarization direction 230 of almost linear polarization of the light beam 200 is the A direction. Until the light beam 200 is reflected on the half mirror 130 and reaches the reflection mirror 140, the polarization direction 230 of almost linear polarization of the light beam 200 is the B direction. On an optical path where the light beam 200 is reflected on the reflection mirror 140, passes through the collimator lens 150 and the object lens 160, and reaches the optical disk 300, the direction 230 of almost linear polarization of the light bean 200 is changed from the B direction to the C direction in FIG. 1. The C direction is rotated by, for example, 45° or 135° with respect to the direction of the track 320.

As described above in detail, in the present example, the optical system including the reflection mirror 140 is configured so as to change the polarization direction of the light beam 200 of almost linear polarization with respect to the direction of the track 320. Thus, by setting a degree of a change in the polarization direction beforehand so as to have a higher signal-to-noise ratio as compared with the case where the polarization direction of the light beam 200 is not changed at all, a detection signal with a high signal-to-noise ratio is read by the photo detector 170 in the subsequent actual operation. That is, the polarization direction is controlled to, for example, 45° with respect to the direction of the track 320 by the phase control of the reflection mirror 140, so that the major axis direction of the far-field region 220 of the light spot can be set at 90° with respect to the direction of the track 320 and thus a high signal-to-noise ratio can be obtained, unlike a conventional technique of controlling a polarization direction by rotating a semiconductor laser 110. The way of changing the polarization direction to increase a signal-to-noise ratio (that is, the setting of an angle in the polarization direction with respect to the direction of the track 320) will be discussed in detail later with reference to FIG. 5 and so on.

Additionally in the present example, a change in the polarization direction of the light beam 200 with respect to the direction of the track 320 is a primary constituent element of the optical pickup 100. The polarization direction can be changed by varying the arrangement of the reflection mirror 140, which serves as a so-called rising mirror, with respect to an optical path. Therefore, a considerable advantage is achieved for simplifying the configuration of the apparatus.

As a result, according to the optical pickup 100 of the present example, it is possible to improve the reproducing characteristic of the optical disk 300, that is, the playing ability of the optical disk 300 without increasing the number of optical components or suppressing an increase in the number of optical components.

EXAMPLE 2 of the optical pickup

Referring to FIGS. 1 and 2, the following will discuss Example 2 of an optical pickup according to the present invention. In the explanation of Example 2 with reference to FIGS. 1 and 2, the explanation of the same constituent elements as Example 1 is omitted. Further, the explanation of the same operations as Example 1 is also omitted.

Unlike Example 1, the polarization direction of a light beam 200 is controlled not by a reflection mirror 140 but by a half mirror 130 in Example 2 of the optical pickup as shown in FIGS. 1 and 2. The other configurations and operations of Example 2 are the same as those of Example 1.

Therefore, during an operation of Example 2, the half mirror 130 reflects the generated light beam 200 and causes the light beam 200 to be incident on the reflection mirror 140. At this point of time, as shown in FIG. 1, the polarization direction of the light beam 200 is changed from the A direction to the D direction on the half mirror 130. The D direction is rotated by, for example, 45° or 135° with respect to the direction of a track 320. The half mirror 130 is subjected to, for example, surface treatment, and the polarization direction can be controlled by phase difference control on a P polarization component and an S polarization component of a light beam by using an evaporated film. To be specific, a phase difference of the P polarization component and the S polarization component in the light beam is controlled according to a thickness of a multilayer film formed on a surface of a transparent substrate such as a glass plate, the number of films in the multilayer film, a material of each film, the selection of a refractive index, and particularly the setting of an interrelation, so that the polarization direction is changed by a desired angle when the half mirror 130 reflects the light beam 200. The half mirror 130 may be integrated into, for example, a plane on a part of a prism constituting a beam splitter or may be disposed as a single half mirror in an optical path.

Subsequently, the reflection mirror 140 reflects the light beam 200 reflected on the half mirror 130 and causes the light beam 200 to be incident on a collimator lens 150.

Thereafter, the light beam 200 incident on the optical disk 300 is reflected on an information recording surface 310 and is incident on the half mirror 130 again via an object lens 160, the collimator lens 150, and the reflection mirror 140. The half mirror 130 transmits the light beam 200 from the optical disk 300 and condenses the light beam 200 on a photo detector 170.

In Example 2, the arrangement of the constituent elements of the optical pickup 100 is the same as Example 1.

Referring to FIG. 1, the following will discuss a change in the angle of a polarization direction 230 of the light beam 200 according to Example 2. The polarization direction 230 is almost linear polarization.

In FIG. 1, until the light beam 200 passes through a grating 120 from the semiconductor laser 110 and reaches the half mirror 130, the polarization direction 230 of almost linear polarization of the light beam 200 is the A direction. On an optical path where the light beam 200 is reflected on the half mirror 130, reaches the reflection mirror 140, is reflected on the reflection mirror 140, passes through the collimator lens 150 and the object lens 160, and reaches the optical disk 300, the direction 230 of almost linear polarization of the light beam 200 is changed from the D direction to the C direction in FIG. 1. As described above, the C direction is rotated by, for example, 45° or 135° with respect to the direction of the track 320.

As described above in detail, in the present example, the optical system including the half mirror 130 is configured so that the polarization direction of the light beam 200 of almost linear polarization is changed with respect to the direction of the track 320. Thus, by setting a degree of a change in the polarization direction beforehand so as to have a higher signal-to-noise ratio as compared with the case where the polarization direction of the light beam 200 is not changed at all, a detection signal with a high signal-to-noise ratio is read by the photo detector 170 in the subsequent actual operation. That is, the polarization direction is controlled to, for example, 45° with respect to the direction of the track 320 by the phase control of the half mirror 130, so that the major axis direction of a far-field region 220 of a light spot can be set at 90° with respect to the direction of the track 320 and thus a high signal-to-noise ratio can be obtained, unlike a conventional technique of controlling a polarization direction by rotating a semiconductor laser 110.

The way of changing the polarization direction to increase a signal-to-noise ratio (that is, the setting of an angle in the polarization direction with respect to the track 320) will be discussed in detail later with reference to FIG. 5 and so on.

Additionally in the present example, a change in the polarization direction of the light beam 200 with respect to the direction of the track 320 is a primary constituent element of the optical pickup 100. The polarization direction can be changed by varying the arrangement of the half mirror 130, which serves as a so-called optical path splitting element, with respect to an optical path. Therefore, a considerable advantage is achieved for simplifying the configuration of the apparatus.

EXAMPLE 3 of the optical pickup

Figure 3:
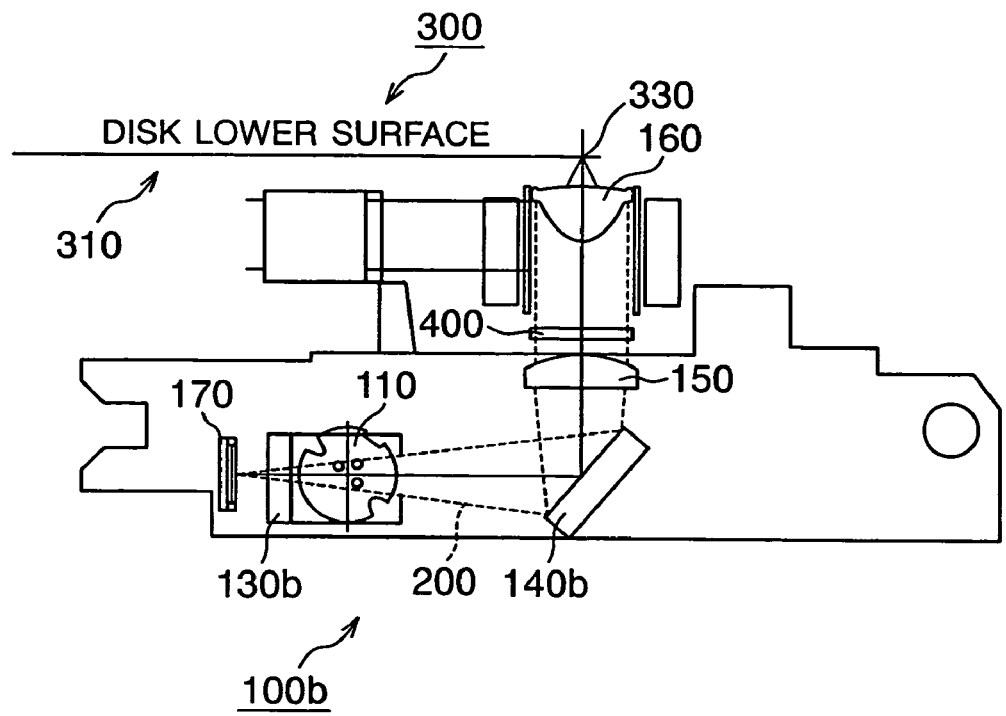
FIG. 3 is a sectional view schematically showing the configuration of an optical pickup having a polarizing plate inserted immediately under an object lens in Example 3 according to the optical pickup of the present invention.

Referring to FIG. 3, the following will discuss Example 3 of an optical pickup according to the present invention. FIG. 3 is a sectional view schematically showing the configuration of the optical pickup according to the present example. In FIG. 3, the same constituent elements as Example 1 or 2 shown in FIG. 1 or 2 are indicated by the same reference numerals and the explanation thereof is omitted. Further, the explanation of the same operations as Example 1 is also omitted.

Example 3 of the optical pickup is configured so that the polarization direction of a light beam 200 is controlled by an optical component added to Example 1 or 2, for example, a polarizing plate.

Namely, as shown in FIG. 3, an optical pickup 100b of Example 3 comprises a semiconductor laser 110, a grating 120, a half mirror 130b, a reflection mirror 140b, a collimator lens 150, an object lens 160, and a photo detector 170. Unlike Example 1 or 2, the half mirror 130b and the reflection mirror 140b are not configured so as to control the polarization direction of the light beam 200 in Example 3. Example 3 comprises a polarizing plate 400 for controlling the polarization direction of the light beam 200, in addition to these optical components. The other configurations and operations of Example 3 are the same as Example 1 or 2.

Therefore, during an operation of Example 3, the half mirror 130b reflects the generated light beam 200 and causes the light beam 200 to be incident on the reflection mirror 140b.

The reflection mirror 140b reflects the light beam 200, which has been reflected by the half mirror 130b, and causes the light beam 200 to be incident on the collimator lens 150.

Subsequently, the light beam 200 is converted from diffused light to parallel light by the collimator lens 150 and is incident on the polarizing plate 400.

Then, the light beam 200 passes through the polarizing plate 400 and is emitted to the object lens 160. At this point of time, the polarization direction is controlled on the polarizing plate 400.

Subsequently, the light beam 200 is condensed by the object lens 160 on an information pit 330 constituting a track (not shown) formed on an information recording surface 310 on an optical disk 300.

Thereafter, the light beam 200 incident on the optical disk 300 is reflected on the information recording surface of the optical disk 300 and is emitted again to the half mirror 130b via the object lens 160, the polarizing plate 400, the collimator lens 150, and the reflection mirror 140b. At this point of time, the polarization direction is controlled on the polarizing plate 400.

Then, the half mirror 130b transmits, from the optical disk 300, the light beam 200 whose polarization direction is controlled and the half mirror 130b condenses the light beam 200 on the photo detector 170.

As described above in detail, in the present example, the optical system including the polarizing plate 400 is configured so as to change the polarization direction of the light beam 200 of almost linear polarization with respect to the direction of the track of the optical disk 300. Thus, by setting a degree of a change in the polarization direction beforehand so as to have a higher signal-to-noise ratio as compared with the case where the polarization direction of the light beam 200 is not changed at all, a detection signal with a high signal-to-noise ratio is read by the photo detector 170 in the subsequent actual operation. That is, the polarization direction is controlled to, for example, 45° with respect to the direction of the track 320 by the phase control of the polarizing plate 400, so that the major axis direction of the far-field region 220 of the light spot can be set at 90° with respect to the direction of the track 320 and thus a high signal-to-noise ratio can be obtained, unlike a conventional technique of controlling a polarization direction by rotating a semiconductor laser 110. The way of changing the polarization direction to increase a signal-to-noise ratio (that is, the setting of an angle in the polarization direction with respect to the direction of the track of the optical disk 300) will be discussed in detail later with reference to FIG. 5 and so on.

Additionally in the present example, a change in the polarization direction of the light beam 200 with respect to the direction of the track of the optical disk 300 is a primary constituent element of the optical pickup 100b. The polarization direction can be changed by providing the polarizing plate 400 which serves as a so-called polarizing element. Therefore, a considerable advantage is achieved for simplifying the configuration of the apparatus.

EXAMPLE 4 of the optical pickup

Figure 4:
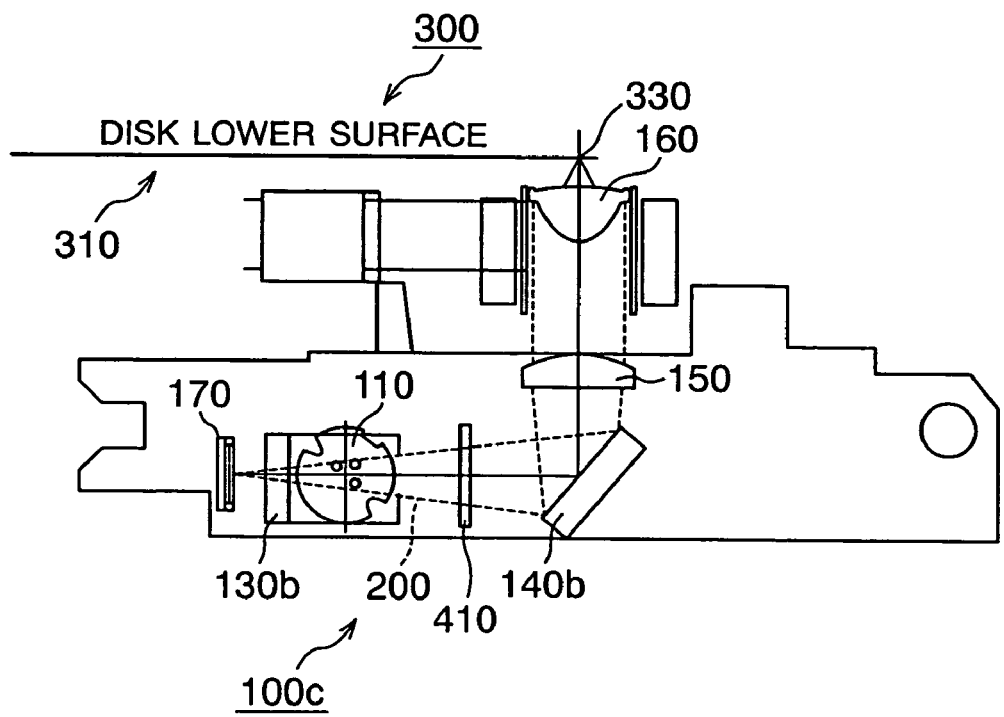
FIG. 4 is a sectional view schematically showing the configuration of an optical pickup having a polarizing plate inserted immediately under a reflection mirror in Example 4 according to the optical pickup of the present invention.

Referring to FIG. 4, the following will discuss Example 4 of an optical pickup according to the present invention. FIG. 4 is a sectional view schematically showing the configuration of the optical pickup according to the present example. In FIG. 4, the same constituent elements as Example 1 of FIG. 1 or Example 3 of FIG. 3 are indicated by the same reference numerals and the explanation thereof is omitted. Further, the explanation of the same operations as Example 1 or 2 is also omitted.

Example 4 of the optical pickup is configured so that the polarization direction of a light beam 200 is controlled by an optical component added to Example 1 or 2, for example, a polarizing plate. Further, Example 4 is different from Example 3 in the position of inserting the polarizing plate.

Namely, as shown in FIG. 4, an optical pickup 100c of Example 4 comprises a semiconductor laser 110, a grating 120, a half mirror 130b, a reflection mirror 140b, a collimator lens 150, an object lens 160, and a photo detector 170. Unlike Example 1 or 2, the half mirror 130b and the reflection mirror 140b are not configured so as to control the polarization direction of the light beam 200 in Example 4. Example 4 comprises a polarizing plate 410 for controlling the polarization direction of the light beam 200, in addition to these optical components. The other configurations and operations of Example 4 are the same as Example 1, 2 or 3.

Therefore, during an operation of Example 4, the half mirror 130b reflects the generated light beam 200 and causes the light beam 200 to be incident on the polarizing plate 410.

Subsequently, the light beam 200 passes through the polarizing plate 410, and is incident on the reflection mirror 140b. At this point of time, the polarization direction is controlled on the polarizing plate 410.

The reflection mirror 140 reflects the reflected light beam 200, and is reflected to the collimator lens 150.

Subsequently, the light beam 200 is converted from diffused light to parallel light by the collimator lens 150 and is incident on the object lens 160.

Subsequently, the light beam 200 is condensed by the object lens 160 on an information pit 330 constituting a track (not shown) formed on an information recording surface 310 on an optical disk 300.

Thereafter, the light beam 200 incident on the optical disk 300 is reflected on the information recording surface of the optical disk 300 and is emitted again to the half mirror 130b via the object lens 160, the collimator lens 150, the reflection mirror 140b, and the polarizing plate 410. At this point of time, the polarization direction is controlled on the polarizing plate 410.

Then, the half mirror 130b transmits, from the optical disk 300, the light beam 200 whose polarization direction is controlled and the half mirror 130b condenses the light beam 200 on the photo detector 170.

As described above in detail, in the present example, the optical system including the polarizing plate 410 is configured so as to change the polarization direction of the light beam 200 of almost linear polarization with respect to the direction of the track of the optical disk 300. Thus, by setting a degree of a change in the polarization direction beforehand so as to have a higher signal-to-noise ratio as compared with the case where the polarization direction of the light beam 200 is not changed at all, a detection signal with a high signal-to-noise ratio is read by the photo detector 170 in the subsequent actual operation. That is, the polarization direction is controlled to, for example, 45° with respect to the direction of the track 320 by the phase control of the polarizing plate 410, so that the major axis direction of the far-field region 220 of the light spot can be set at 90° with respect to the direction of the track 320 and thus a high signal-to-noise ratio can be obtained, unlike a conventional technique of controlling a polarization direction by rotating a semiconductor laser 110. The way of changing the polarization direction to increase a signal-to-noise ratio (that is, the setting of an angle in the polarization direction with respect to the direction of the track of the optical disk 300) will be discussed in detail later with reference to FIG. 5 and so on.

Additionally in the present example, a change in the polarization direction of the light beam 200 with respect to the direction of the track of the optical disk 300 is a primary constituent element of the optical pickup 100b. The polarization direction can be changed by providing the polarizing plate 410 which serves as a so-called polarizing element. Therefore, a considerable advantage is achieved for simplifying the configuration of the apparatus.

(Variations of the Optical Pickup)

The following will discuss the variations of an optical pickup according to the present invention.

According to one variation, the polarization direction of a light beam is controlled by an added optical component, for example, a reflection mirror. In this variation, the reflection mirror may be selectively inserted as long as the same effect is obtained as polarization direction control performed by the reflection mirror of Example 1.

In another variation, it is not always necessary to provide a single optical component for controlling the polarization direction of a light beam. For example, a combination of two or more optical components, for example, a combination of a reflection mirror and a half mirror may be used to control the polarization direction of a light beam. In addition to the optical components for controlling the polarization direction of a light beam in the examples, the function of controlling the polarization direction of a light beam may be partly or entirely shared by an object lens, a collimator lens, a grating, and so on. In either case, as long as an optical component only for controlling the polarization direction of a light beam is not introduced, that is, as long as an optical component also having a function other than control on the polarization direction of a light beam is adopted, it is possible to achieve the effect of reducing the number of optical components according to the present example. However, even when an optical component only for controlling the polarization direction of a light beam is introduced, it is possible to achieve the effect of improving a signal-to-noise ratio and perform proper reproduction according to the present example.

(Setting of an Angle in a Polarization Direction According to the Examples)

Figure 5A:
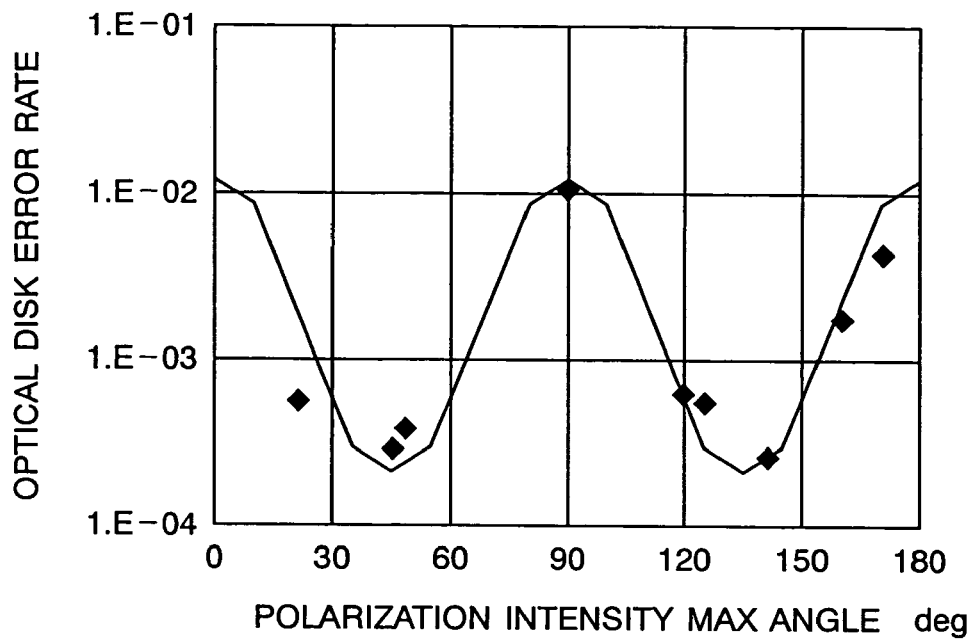
FIG. 5A is a characteristic diagram showing a correlation between a reading error rate of an optical disk and the setting of an angle in a polarization direction.
Figure 5B:
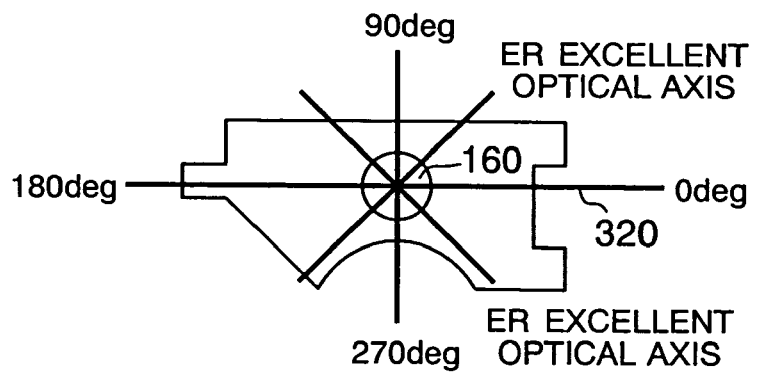
FIG. 5B is a top view schematically showing an object lens disposed at the center in the optical pickup so as to explain the angle setting, in the examples according to the optical pickup of the present invention.
Figure 5B:
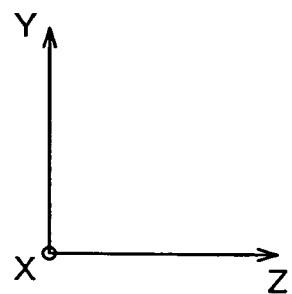

Referring to FIGS. 5A and 5B, the following will discuss the way of changing a polarization direction so as to increase a signal-to-noise ratio (that is, the setting of an angle in a polarization direction with respect to the direction of a track 320) in the examples of the optical pickup. FIG. 5A is a characteristic diagram showing a correlation between a reading error rate of an optical disk and the setting of an angle in a polarization direction. FIG. 5B is a top view schematically showing an object lens 160 at the center in an optical pickup to explain the angle setting.

In FIG. 5A, a horizontal axis represents an angle in the polarization direction from 0° to 360 with respect to a track direction. The angle in the polarization direction corresponds to an angle in a polarization direction shown in FIG. 5B, in which the polarization direction has linear polarization in a counterclockwise direction with the object lens 160 at the center, taken from the top. That is, when an angle in the polarization direction is 0°, linear polarization direction is in parallel with the track direction. This applies also when an angle in the polarization direction is 180°. When an angle in the polarization direction is 90°, linear polarization direction is orthogonal to the track direction. This applies also when an angle in the polarization direction is 270°.

In FIG. 5A, a vertical axis represents a reading error rate of the optical disk. "1.E-03" represents "$10^{-3}$" which indicates the permissible range limit of a reading error rate of the optical disk. That is, when the optical disk has a reading error equal to or larger than this value, image data has a frozen image and block noise, and sound data has disconnected sound. Further, black rhombuses indicate the plot of actual measured values of experimental data.

In FIGS. 5A, 5B, and 1, the directions of illustrated coordinate axes are the same.

As is understood from FIG. 5A, the polarization direction is changed by the reflection mirror, the half mirror, and the polarizing plate, and so on of the examples such that the polarization direction forms an angle of 30° to 60° with respect to the track direction. Thus, an error rate during the reading of the optical disk 300 can be reduced to $10^{-3}$ within a permissible range on practical use. Therefore, when an angle in the polarization direction is set at 30° to 60°, mainly around 45° with respect to the track direction, it is possible to improve the reproducing characteristic of the optical disk with relative ease.

As is understood from FIG. 5A, when the polarization direction is changed by the reflection mirror, the half mirror, the polarizing plate, and so on of the examples such that the polarization direction forms an angle of 40° to 50°, mainly around 45° with respect to the track direction, it is possible to suppress an error rate during the reading of the optical disk 300 positively to $10^{-3}$ within the permissible range on practical use, regardless of variations in performance and quality among apparatuses.

As is understood from FIG. 5A, when the polarization direction is changed by the reflection mirror, the half mirror, the polarizing plate, and so on of the examples such that the polarization direction forms an angle of almost 45° or practically exact 45° with respect to the track direction, it is possible to suppress an error rate during the reading of the optical disk 300 to a minimum value, a lowest value, or a close value which is much smaller than, for example, $10^{-3}$ during an operation.

In all cases, as compared with the assumption that the polarization direction is not changed by any one of the reflection mirror, the half mirror, the polarizing plate, and so on of the examples, it is desirable to change the polarization direction by the reflection mirror, the half mirror, the polarizing plate, and so on of the examples such that an angle in the polarization direction is brought close to 45° with respect to the track direction. Hence, as compared with the assumption that the polarization direction is not changed, a signal-to-noise ratio can be improved to a greater or lesser degree according to a degree of bringing the angle close to 45°.

In the above-described examples, a semiconductor laser emitting a light beam of almost linear polarization is used as a light source of the optical pickup. The light source is not particularly limited in the present invention. Other kinds of laser light source and a light source other than a laser are also applicable as long as a light beam of linear polarization is emitted or a light beam is emitted which includes, as a major component, elliptic polarization close to linear polarization or linear polarization and also includes other components.

EXAMPLE of an Information Reproducing Apparatus

Referring to FIG. 6, the following will discuss the example of an information reproducing apparatus according to the present invention. FIG. 6 is a block diagram showing the present example.

In FIG. 6, an information reproducing apparatus 1001 composed of an optical disk player comprises the optical pickup 100 of the examples, a reproducing circuit 1002 for reproducing recorded information which corresponds to an information signal based on a detection output of the photo detector of the optical pickup 100, a spindle motor 1004 for rotating an optical disk 300, and a slider motor 1006 for moving the optical pickup 100 in the radius direction of the optical disk 300. The information reproducing apparatus 1001 further comprises a control section 1008 including a microcomputer for controlling these constituent elements.

During reproduction, under the control of the control section 1008, a light beam 200 only for reading is incident on the optical disk 300 by the optical pickup 100, and the light beam 200 incident on and reflected by the optical disk 300, passed via an optical system (FIG. 1) including a half mirror and a reflection mirror is detected by the photo detector. Then, based on a detection signal from the photo detector, recorded information such as image information, sound information, and data information is reproduced by the reproducing circuit 1002. The recorded information has been recorded as an information pit array on a track 320 of the optical disk 300. As a result, reproduction output including image information is outputted to a display, an audio output apparatus, and an external recorder.

Since the information reproducing apparatus 1001 comprises the optical pickup 100 of the above-described example, it is possible to improve the reproducing characteristic of the optical disk without increasing the number of optical components or while suppressing an increase in the number of optical components.

Particularly in the present example, the inward movement of the optical pickup 100 that is made by the slider motor 1006 is limited by the spindle motor 1004 disposed on the inner periphery of the optical disk 300. Thus, generally it tends to be difficult to control the radiation of the light beam 200 and control reading when reproduction is performed on the inner periphery of the optical disk 300, so that ill effects such as jitter are likely to occur. Thus, the optical pickup 100 of the present example is configured thus. Since the optical pickup 100 is small with a high signal-to-noise ratio, reproduction can be performed on the inner periphery of the optical disk 300 without any problems, achieving a considerably advantage on practical use.

The present invention is not limited to the above-described examples but may be properly changed within a range not departing from the gist or idea of the present invention that is read from the claims and specification. An optical pickup with such changes is also included in the technical range of the present invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2003-046613 filed on Feb. 24, 2003 including the specification, claims, drawings and summary is incorporated herein by reference in its entirety.

What is claimed is:

1. An optical pickup for reading an information signal by emitting a light beam to an information recording surface of a recording medium having a recording track composed of information pits arranged for recording the information signal, comprising:
   a light source which emits the light beam having linear polarization;
   an optical system which guides the emitted light beam to the information recording surface and further guides light that is emitted from the information recording surface based on the guided light beam, to an optical path different from an optical path to the light source; and
   a light-receiving device which receives the light guided by the optical system from the information recording surface,
   wherein the optical system controls a polarization direction of the emitted light beam, with respect to a direction of the recording track, and
   wherein the optical system comprises a semitransparent semireflecting mirror which reflects the emitted light beam, guides the light beam to the information recording surface after changing the polarization direction upon reflection, transmits the light from the information recording surface, and guides the light to the light-receiving device of the optical pickup.

2. The optical pickup according to claim 1, wherein the optical system includes a reflection mirror which reflects the emitted light beam and changes the polarization direction upon reflection.

3. The optical pickup according to claim 1, wherein the optical system includes a grating which diffracts the emitted light beam and changes the polarization direction upon diffraction.

4. The optical pickup according to claim 1, wherein the optical system changes the polarization direction so that an angle in the polarization direction is close to 45° with respect to the direction of the recording track, as compared with the case where the optical system changes no polarization direction.

5. The optical pickup according to claim 4, wherein the optical system changes the polarization direction so that the angle is set at 30° to 60°.

6. The optical pickup according to claim 5, wherein the optical system changes the polarization direction so that the angle is set at 45°.

7. The optical pickup according to claim 1, wherein the optical system includes a glass plate with a predetermined thickness, the glass plate transmitting the emitted light beam and changing the polarization direction upon transmission.

8. The optical pickup according to claim 1, wherein the optical system includes a polarizing plate which transmits the emitted light beam and changes the polarization direction upon transmission.

9. The optical pickup according to claim 1, wherein the light source emits the light beam so that flux of light is elliptical in cross section and is shaped like an ellipse having a major axis orthogonally to the polarization direction.

10. The optical pickup according to claim 1, wherein
    the light source composes of a semiconductor laser; and
    the optical system controls a polarization direction regarding a major component of the emitted light beam.

11. An information reproducing apparatus, comprising:
    the optical pickup according to claim 1, and
    a reproducing device which reproduces recorded information corresponding to the information signal based on a detection output of the light-receiving device of the optical pickup.

* * * * *